(12) United States Patent
Thienard et al.

(10) Patent No.: US 9,669,804 B2
(45) Date of Patent: Jun. 6, 2017

(54) CONNECTOR FOR INSTALLING AND ARTICULATING A WINDSCREEN WIPER ON THE END OF A DRIVE ARM

(71) Applicant: Valeo Systèmes d'Essuyage, Le Mesnil Saint Denis (FR)

(72) Inventors: Jean-Claude Thienard, Dieppe (FR); Frédéric Boussicot, Conflans Ste Honorine (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 226 days.

(21) Appl. No.: 14/224,860

(22) Filed: Mar. 25, 2014

(65) Prior Publication Data

US 2014/0230176 A1 Aug. 21, 2014

Related U.S. Application Data

(63) Continuation of application No. 12/067,647, filed as application No. PCT/EP2006/009185 on Sep. 21, 2006, now Pat. No. 8,719,994.

(30) Foreign Application Priority Data

Sep. 21, 2005 (FR) ...................................... 05 09616

(51) Int. Cl.
*B60S 1/40* (2006.01)
*B60S 1/38* (2006.01)

(52) U.S. Cl.
CPC ........... *B60S 1/4048* (2013.01); *B60S 1/3849* (2013.01); *B60S 1/3868* (2013.01); *B60S 1/4038* (2013.01);

(Continued)

(58) Field of Classification Search
CPC .... B60S 1/3849; B60S 1/4045; B60S 1/4048; B60S 2001/4051; B60S 2001/4054; B60S 1/3868; B60S 1/4038

(Continued)

(56) References Cited

U.S. PATENT DOCUMENTS 7,979,950 B2 7/2011 Boland
8,719,994 B2 * 5/2014 Thienard ............... B60S 1/3868
15/250.201

(Continued)

FOREIGN PATENT DOCUMENTS

DE 103 47 637 5/2005
EP 1 403 156 3/2004

(Continued)

OTHER PUBLICATIONS

International Search Report (English & French) for PCT/EP2006/009185 mailed Dec. 11, 2006 (6 pages).

*Primary Examiner* — Gary Graham
(74) *Attorney, Agent, or Firm* — Osha Liang LLP

(57) ABSTRACT

An assembly including a windscreen wiper and a connector between the windscreen wiper and a drive arm, the wiper extending in a longitudinal direction, and the connector is capable of being installed in a free end of the drive arm and further includes an attachment element permanently fixed to the wiper, and an installation element pivotally mounted onto the attachment element. The installation element includes elastically deformable locking means with a portion that is capable of ensuring locking in the longitudinal direction of the connector in an installed position thereof in the free end of the arm. The locking means includes a tab that extends in the longitudinal direction of the wiper. The attachment element is configured to restrict the ability of the tab to pivot.

9 Claims, 3 Drawing Sheets

(52) U.S. Cl.
CPC ............ *B60S 1/3808* (2013.01); *B60S 1/3848* (2013.01); *B60S 1/3879* (2013.01); *B60S 2001/4051* (2013.01); *B60S 2001/4054* (2013.01)

(58) Field of Classification Search
USPC ...................................... 15/250.32
See application file for complete search history.

(56) References Cited

U.S. PATENT DOCUMENTS

2006/0059647 A1* 3/2006 Ostrowski ............. B60S 1/3868
15/250.32
2007/0214593 A1* 9/2007 Boland ................. B60S 1/3848
15/250.23

FOREIGN PATENT DOCUMENTS

| EP | 1 541 434 | | 6/2005 |
|---|---|---|---|
| EP | 1623898 B1 | | 12/2007 |
| FR | 2 781 741 | | 2/2000 |
| WO | 03/084789 | | 10/2003 |
| WO | 03/084790 | * | 10/2003 |
| WO | 2004/048163 | | 6/2004 |
| WO | 2004/098962 | | 11/2004 |

* cited by examiner

CONNECTOR FOR INSTALLING AND ARTICULATING A WINDSCREEN WIPER ON THE END OF A DRIVE ARM

CROSS-REFERENCE TO RELATED APPLICATIONS

This is a divisional application of U.S. patent application Ser. No. 12/067,647, filed on Mar. 20, 2008, which is a national stage application of PCT/EP2006/009185 filed Sep. 21, 2006, which claims priority to French Patent Application No. 0509616, filed Sep. 21, 2005. The priority applications are hereby incorporated by reference in their entirety.

The invention provides a connector (10) between a windscreen wiper (12) and a drive arm (14), the wiper extending in a longitudinal direction and the connector being suitable for being installed in the free end (14a) of the arm (14) and comprising an attachment part equipped with a housing (32) that is open towards the bottom and allows removable attachment in the vertical direction of the wiper (12) with the connector (10), and an elastically deformable locking device having one portion that is capable of locking in the longitudinal direction of the connector (10) in its installed position in the free end (14a) of the arm (14).

Document EP-A-1.403.156 describes such a connector installed on an element for installing a wiper by elastic fitting.

For this, the lateral flanges of the connector are capable of being elastically deformed by transversal separation from each other during the installation of the connector in order to allow the insertion of the axes of the mounting element. The flanges of the connector are also capable of returning elastically to their initial position when the connector is in its installed position on the linking element.

Such elastic fitting of the connector on the linking element requires the user to exert considerably large forces in order to cause the separation of the flanges of the connector at the risk of damaging the connector.

In addition, due to the transversal deformation of the flanges during the installation of the connector on the installation element, it is not possible to install the connector on the installation element when the connector is already in installed position in the free end of the arm.

Document EP-A-1.541.434 describes such a connector, which is installed on the axis of articulation of the compensator wiper by removable attachment. For this purpose, the connector comprises means for attachment by snap-fitting to the wiper.

The connector also comprises means for locking it to the arm, in the form of elastically deformable tabs, whose free ends are capable of being inserted in a complementary orifice made in the top spine of the end of the arm.

Such an arrangement in which the attachment and locking means are located on the same single part makes it necessary to have a specific connector for each type of wiper.

The invention aims to provide a connector which the user can easily install on the wiper and with the arm, with no risk of damaging it. Another aim of the invention is to provide a connector in which the structure does not depend on the structure of the wiper.

With this aim, the invention provides a connector of the type described previously, characterised in that the bottom part constitutes an installation element that is separate from the locking means and in that the locking means comprise a tab that extends longitudinally in relation to the general direction of the wiper.

According to further characteristics of the invention:

the connector comprises two lateral flanges that each extend in an overall vertical plane, the flanges being suitable for being installed transversally on either side of a wiper installation element, and each wiper comprising a transversal housing that is capable of receiving the pivoting transversal axle for articulation of the installation element, on each flange, the transversal housing has a bottom opening which is at least partially delimited by an elastically deformable attachment portion that therefore allows the installation and removal of the connector from the wiper as well as the attachment of the transversal axle in its installed position in the housing, the longitudinal locking of the connector with the arm is carried out by the connector-side end of the tab, located level with the bottom part of the connector, the tab is located to the rear of the connector, its connector-side end at least partially forming a longitudinal stop towards the rear of at least one end section associated with the arm, the tab is elastically deformable so that its end on the side of the connector is mobile between a lower locking position in which the associated bottom end section is capable of coming to a stop towards the rear against the connector-side end, and a raised unlocking position that allows the connector so slide longitudinally towards the front with regard to the arm, the width of the connector-side end of the tab is less than the distance between the two wings at the end of the arm so that the connector-side end of the tab is capable of being housed between the wings at the end of the arm when it is in raised position, the connector-side end of the tab is designed such as to form a longitudinal stop for the lower end section of each wing at the end of the arm, each flange of the connector comprises a lateral portion that can be deformed elastically and which is shaped such as to allow the installation of the end of the arm on the connector by elastic insertion following a downward vertical movement, each lateral portion is capable of deforming transversally towards the inside of the connector to allow the passage of an associated lower end section during the installation of the end of the arm on the connector, and is capable of returning elastically to the position in which the associated lower end section comes to a stop upwards against the lower end of said lateral portion;

the connector comprises a front nose against which the end of the arm comes to a stop longitudinally towards the front.

Further characteristics and advantages of the invention will appear from reading the following detailed description, made in reference to the appended figures, in which.

For the description of the invention, the vertical, longitudinal and transversal directions will be used, non-exhaustively, according to the V, L, T markers shown in the figures.

Figure 1:
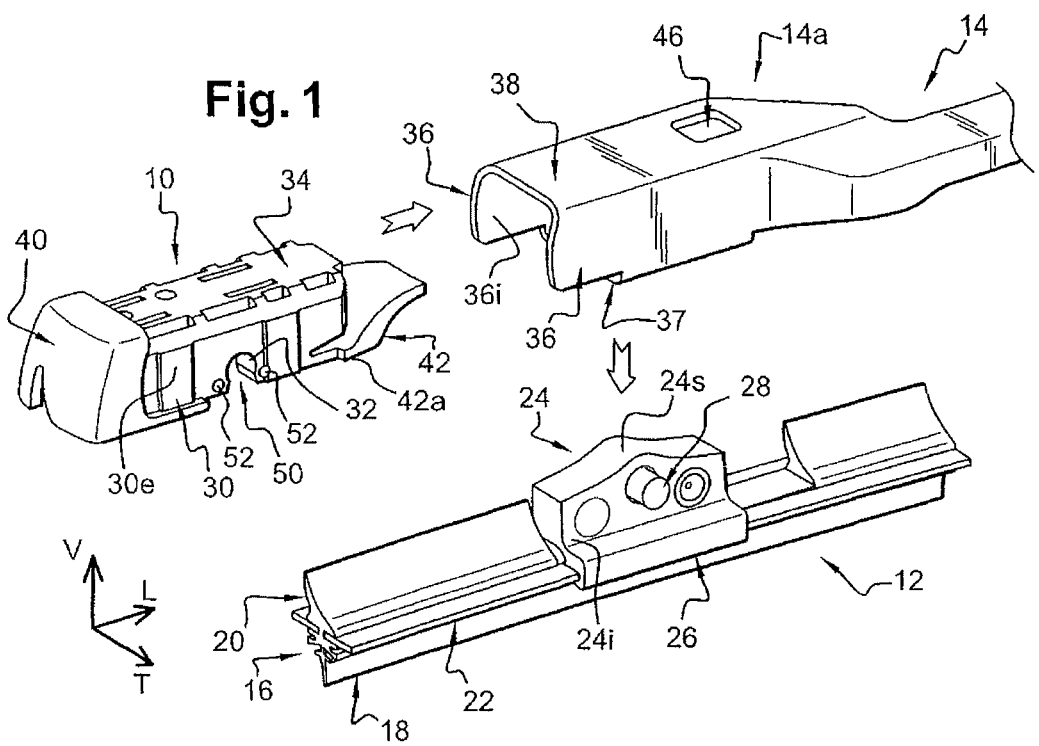
FIG. 1 is a diagrammatic depiction in exploded perspective of an arrangement for the installation of a windscreen wiper on the end of a drive arm by means of a connector according to the invention.

Likewise, the front to rear direction will be adopted according to the arrow F in FIG. 1, namely from left to right according to the longitudinal direction of the wiper.

In the following description, identical, similar or analogue elements will be denoted using the same reference numbers.

FIG. 1 depicts a connector 10 for the installation and articulation of a windscreen wiper 12 of a glass panel of a motor vehicle in relation to the free end 14a of a drive arm 14 of the wiper 12.

The connector 10 is capable of being installed on an installation element 24 of the wiper 12 that is different to the locking means, and is capable of being installed in the free end 14a of the arm 14.

The wiper 12 is a thin wiper of the flat blade type, comprising a scraper 16 extending longitudinally, which consists, at the bottom, of a blade 18 intended for rubbing against the window to be wiped, and comprising, at the top, an attachment heel 20.

The windscreen wiper 12 also comprises two stiffening spines 22, each of which is housed in a complementary groove made in a lateral edge of the heel 20.

The spines 22 are designed such as to ensure the rigidity of the windscreen wiper 12, making it possible to distribute the force that pushes the scraper 16 against the window to be wiped along its entire length.

The windscreen wiper 12 also includes an installation element 24 on which the connector 10 is installed, and which is arranged overall longitudinally at the centre of the wiper 12, overlapping the heel 20 and the spines 22 of the wiper 12.

The installation element 24 extends overall longitudinally and vertically above the heel 20 of the scraper 16, it comprises at its bottom end 24i two lateral hooks 26 that extend overall downwards so that they are distributed transversally on either side of the spine 20 of the wiper 12 and such as to ensure the attachment of the installation element 24 on the wiper 12.

The installation element 24 comprises two lateral articulation axles 28, each one of which projects transversally with regard to a vertical longitudinal lateral face 24a of the installation element 24 so that the two axles 28 are coaxial to a transversal axis A for articulation of the wiper 12 in relation to the free end 14a of the arm 14.

The connector 10 comprises two lateral flanges 30 which each extend in a vertical longitudinal plane, and which are capable of being installed transversally on either side of the installation element 24 so that each of the inner vertical longitudinal faces 30i opposite the flanges 30 (FIG. 3) is located opposite one lateral face 24a of the installation element 24 when the connector 10 is installed on the installation element 24.

Each flange 30 additionally comprises a transversal housing 32, which in this case is open towards the bottom, in other words, open at each of its ends, in which a transversal axle 28 associated with the installation element 24 is housed in rotation when the connector 10 is in the installed position on the installation element 24 in order to articulate the wiper 12 with regard to the connector.

The connector 10 also comprises a top transversal spine 34 that connects the flanges 30 to each other and which is arranged above the installation element 24 when the connector 10 is installed on the installation element 24.

According to the invention, each lateral flange 30 comprises a lower opening 50 that connects the transversal housing 32 to the lower longitudinal edge 30i of the flange 30.

This opening 50 is capable of receiving the transversal axle 28 associated with the transversal housing 32 when the connector 10 is installed on the installation element 24.

The opening 50 is longitudinally delimited by two opposing attachment portions 52 that are designed so that the shortest distance between the attachment portions 52 is less than the diameter of the associated transversal axle 28.

The attachment portions 52 are additionally adapted to be elastically deformed when the connector 10 is installed on the installation element 24 and when the connector is removed 10 from the installation element 24 so that they are separated from each other in order to allow the passage of the vertically associated transversal axle 28 through the opening 50 and so that they return elastically to their initial position, preventing the vertical movement of the transversal axle 28 through the opening 50.

Therefore, during the installation of the connector 10 on the installation element 24, the flanges 30 of the connector 10 are not subjected to any transversal deformation towards the outside of the connector 10.

It is therefore possible to install and/or remove the connector 10 from the installation element 24 when the connector is already installed in the free end 14a of the arm 14, or prior to the installation of the connector 10 in the free end 14a of the arm 14.

The connector 10 is also capable of being installed in the free end 14a of the arm 14 which consists of two parallel longitudinal wings 36, which are connected by a horizontal top spine 38, thereby delimiting a longitudinal housing that is open towards the front.

When the connector 10 is in installed position in the end of the arm, the outside face 30e of each flange 30 is resting entirely against the inside face 36i opposite one wing 36, and the top horizontal face 34s of the transversal spine 34 of the connector 10 is resting upwards against the bottom horizontal face 38i of the spine 38 of the end of the arm.

Figure 3:
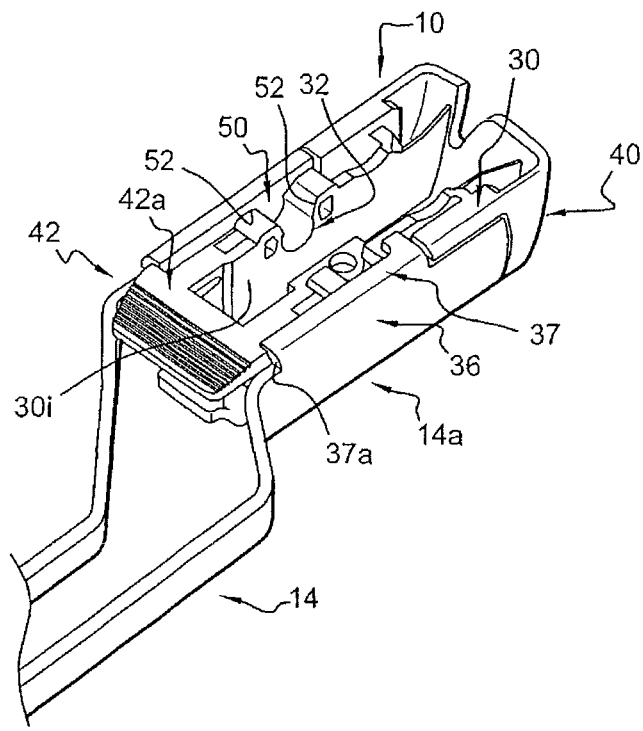
FIG. 3 is a view from below of the connector in installed position in the free end of the arm.

As can be seen in greater detail in FIG. 3, each wing 36 of the free end 14a of the arm 14 comprises a lower end section 37, which is bent transversally in the direction of the other wing 36.

Each lower end section 37 is designed such as to extend under the longitudinal edge of the lower end 30a of an associated flange 30 when the connector 10 is in installed position in the end of the arm 14 and such as to come to a stop upwards against this lower edge 30a of the associated flange 30.

In this way, the free end 14a of the arm 14 delimits an overall cylindrical housing with a longitudinal main axis in which the flanges 30 and the top spine 34 of the connector 10, are housed such as to be able to slide longitudinally in the free end 14a of the arm 14 for the installation and/or removal of the connector 10 from the free end 14a of the arm 14.

The connector 10 also comprises means for locking it longitudinally in installed position in the free end 14a of the arm 14.

These locking means comprise a front nose 40 that is capable of coming to a stop longitudinally towards the rear against the free end 14a of the arm 14, and an elastically deformable longitudinal locking tab 42 that can lock the connector 10 longitudinally in a forward movement in relation to the free end 14a of the arm 14.

As can be seen in greater detail in FIG. 3, the locking tab 42 extends longitudinally towards the rear from the lower end edge 30a of each flange 30 and it comprises a connector-side end 42a which is capable of resting longitudinally forwards against an edge opposite the free end 14a of the arm 14.

In addition, the tab 42 is capable of being deformed elastically, so that its connector-side end 42a is mobile overall vertically between a locking position in which it rests longitudinally forwards against an edge opposite the free end 14a of the arm 14, and an unlocking position in which the connector-side end 42a of the tab 42 is located transversally between the two wings 36 of the end 12a of the arm, allowing the connector 10 to slide longitudinally forwards.

In this case, when the connector-side end 42a of the tab 42 is in locking position, it rests longitudinally forwards against the rear longitudinal end edge 37a of the bottom section 37 of each wing 36.

The connector-side end 42a of the tab 42 is shaped so that its transversal width is greater than the distance between the inner transversal end edges 37i opposite the lower sections and so that its width is less than the transversal distance between the two wings 36 of the free end 14a of the arm 14.

The connector-side end 42a of the tab 42 also comprises a rear ramp-shaped portion that is capable of resting against the lower sections 37 during the installation of the connector 10 in the free end 14a of the arm 14 in order to cause the upward movement of the connector-side end 42a of the tab 42 towards its unlocking position.

In this way, for installing the connector 10 in the free end 14a of the arm 14, the elastic deformation of the tab 42 is caused by the ramp-shaped portion of the connector-side end 42a of the tab 42 resting against the lower sections 37.

On the other hand, for the removal of the connector 10 from the free end 14a of the arm 14, the elastic deformation of the tab 42 is caused by an action of the user on the ramp-shaped portion of the connector-side end 42a of the tab 42, which guarantees, in particular, the locking of the connector 10 in installed position in the free end 14a of the arm 14.

Figure 4:
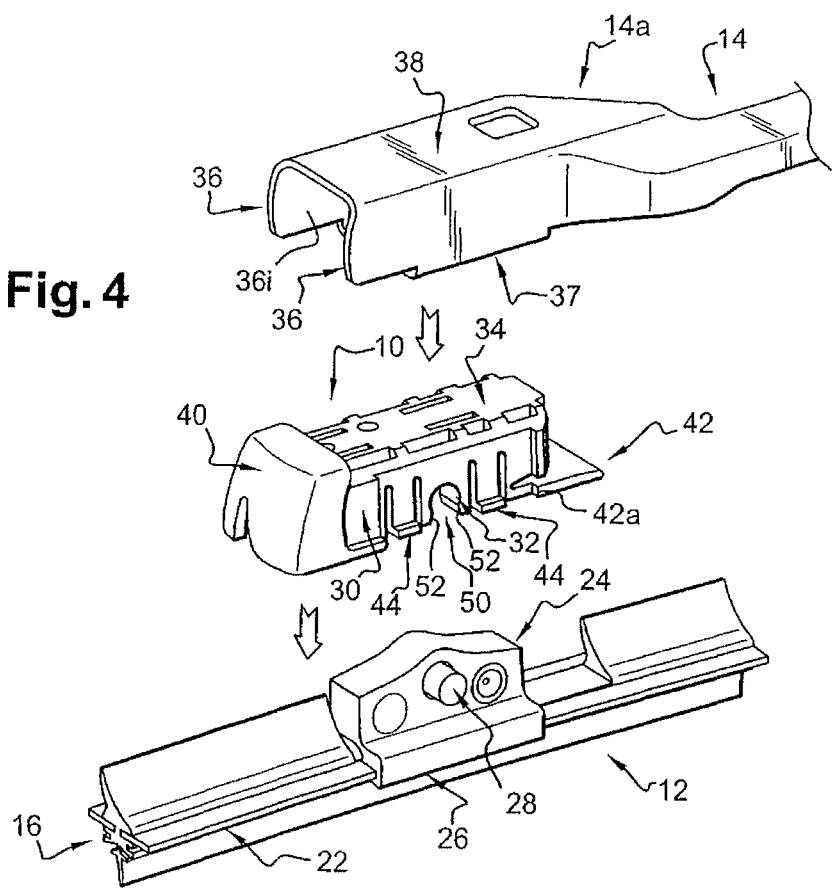
FIG. 4 is a view similar to that shown in FIG. 1, showing an alternative embodiment of the connector allowing the installation of the connector in the free end of the arm in a vertical direction.

FIG. 4 shows an alternative embodiment of the connector 10 allowing it to be installed in the free end 14a of the arm 14 either by means of a sliding movement towards the rear, as described previously, or by means of a vertical upward movement.

For this reason, according to this alternative embodiment, each flange 30 comprises an elastically deformable portion 44 in which the outer vertical longitudinal face 44e is transversally flush with the outer vertical longitudinal face 30e of the flange 30, and which is capable of disappearing transversally towards the inside of the connector 10 during the installation of the connector 10 in the free end 14a of the arm 14, freeing up a space for the passage of the lower section 37 of an associated wing 36.

The portion 44 of the flange 30 is positioned overall longitudinally to the right of the lower section 37 of the associated wing 36, the lower section 37 then rests against the portion 44 to cause it to deform towards the inside of the connector 10 when installing the connector 10 in the free end 14a of the arm 14, and its longitudinal dimension is larger than that of the associated lower section 37.

On the other hand, the portion 44 of the flange 30 is made in such a way that, when the connector 10 is in installed position in the free end 14a of the arm 14, the associated lower section 37 comes to a stop against the lower longitudinal edge 44i of the portion 44 of the flange 30.

Figure 5:
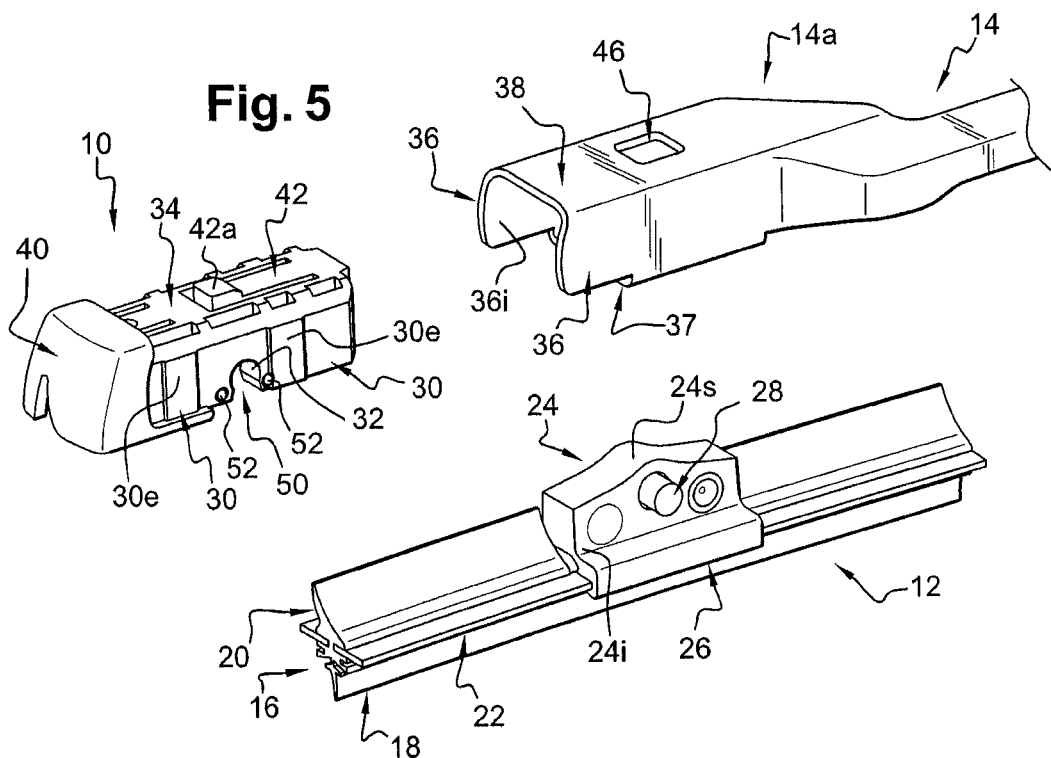
FIG. 5 is a view similar to that of FIG. 1, showing another alternative embodiment of the connector wherein the tongue is arranged in the upper part of the connector.
Figure 6:
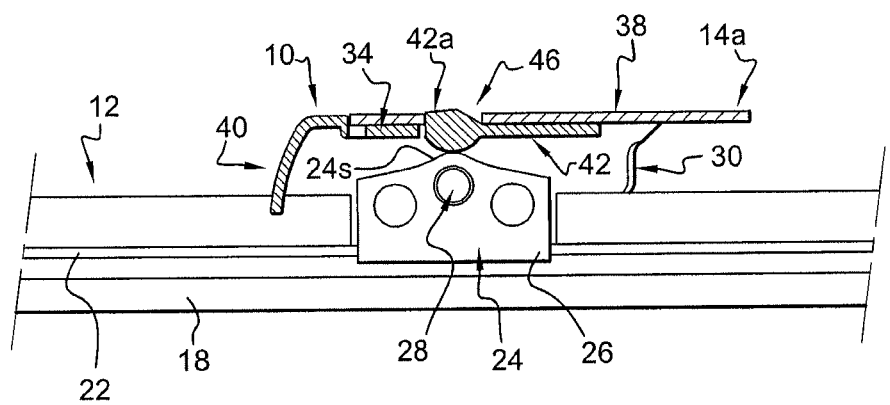
FIG. 6 is a section along a vertical longitudinal plane of the mounting connector shown in FIG. 5. The connector is in the mounted position on the connecting element and the blade in the free end of arm.

FIGS. 5 and 6 show another alternative embodiment of the connector 10 according to the invention in which the locking tab 42 is formed in the spine 34 of the connector 10 and extends overall longitudinally forwards so that its connector-side end 42a is capable of being inserted in a complementary orifice 46 of the top spine 38 of the free end 14a of the arm 14.

In this way, when the connector 10 is in installed position in the free end 14a of the arm 14, the tab 42 extends under the top spine 38 of the free end 14a of the arm 14.

In order to remove the connector 10 from the free end 14a of the arm 14, the user presses the connector-side end 42a of the tab 42 so that it comes out of the associated orifice in a descending movement. It is then possible to make the connector 10 slide longitudinally forwards in relation to the free end 14a of the arm 14.

According to a preferred embodiment of this alternative embodiment, the installation element 24 is capable of ensuring the locking of the connector-side end 42a of the tab 42 in position in the orifice 46 when the connector 10 is in installed position on the installation element 24 of the wiper 12.

For this reason, the connector 10 is made so that, when it is in installed position on the installation element 24, the connector-side end 42a of the tab 42 is resting downwards against a top part 24s of the installation element 24.

In this way, as shown in greater detail in FIG. 6, when the connector 10 is in installed position in the free end 14a of the arm 14 and on the linking element 24, the connector-side end 42a of the tab 42 is locked in position in the orifice 46 of the top spine 38 of the free end 14a of the arm 14. Thus, it is not possible to remove the connector 10 from the free end 14a of the arm 14.

Therefore, the installation of the connector 10 in the free end 14a of the arm 14 can only be performed prior to the installation of the connector 10 on the installation element 24 and, on the other hand, the removal of the connector 10 from the free end 14a of the arm 14 can only be performed when the connector 10 is not in installed position on the installation element 24.

Such an assembly of the connector 10 on the installation element 24 after installation in the free end 14a of the arm 14 is allowed by the opening 50 of each flange 30 which is made so that the insertion of the axles 28 in the associated transversal housings 32 does not cause a transversal deformation of the flanges 30 as mentioned previously.

The connector 10 according to the invention is described and shown as being used for the installation of the wiper 12 on a drive arm 14 in which the free end 14a comprises an orifice 46 made in its top spine.

Figure 2:
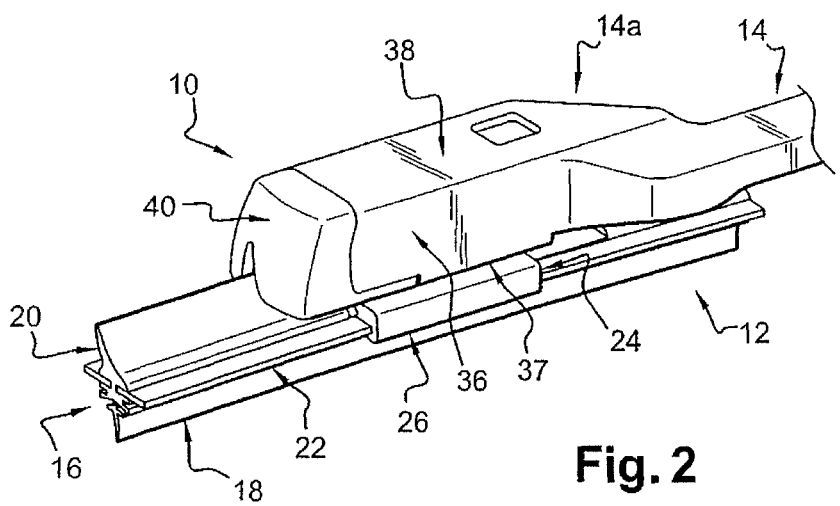
FIG. 2 is a view similar to that shown in FIG. 1, showing the windscreen wiper in installed position on the end of the arm by means of the connector.

However, it must be understood that the invention is not limited to this embodiment, and that the connector 10 according to the embodiments of the invention shown in FIGS. 1, 2 and 4 can be installed in a free end 14a of the drive arm 14 that does not comprise an orifice, or in a free end 14a of an arm 14 in which each wing 36 comprises an orifice.

In addition, the installation element 24 can be installed in wipers with a different structure, for example comprising a stiffening spine 22 designed to be inserted in a support element also comprising means for supporting the scraper 16.

The invention claimed is:

1. An assembly comprising a windscreen wiper and a connector between the windscreen wiper and a drive arm, the wiper extending in a longitudinal direction, and the connector being capable of being installed in a free end of the drive arm, the assembly further comprising:
    an installation element that is attached to the wiper; and
    the connector that is pivotally mounted onto said installation element,
    wherein said connector comprises elastically deformable locking means having a portion that is capable of ensuring locking in the longitudinal direction of the connector in an installed position thereof in the free end of the arm,
    wherein the locking means comprise a tab that extends in the longitudinal direction of the wiper,
    wherein the installation element is configured to restrict the ability of the tab to pivot, and
    wherein a connector-side end of the tab is resting against a part of the installation element.

2. The assembly according to claim 1, wherein the connector comprises two lateral flanges, each extending in an overall vertical plane, the flanges being suitable for being installed transversally on either side of the installation element of the wiper, and each flange comprising a transversal housing that is capable of receiving a pivoting transversal axle for articulation of the installation element.

3. The assembly according to claim 2, wherein, on each flange, the transversal housing has a lower opening, delimited, at least partially, by an elastically deformable attachment portion that allows for an installation and removal of the connector from the wiper as well as the attachment of the transversal axle in an installed position in the housing.

4. The assembly according to claim 2, wherein the connector comprises a front nose against which the end of the arm is configured to rest longitudinally forward.

5. The assembly according to claim 2, wherein the tab is rotatable along a hinge axis between a locking position retaining the windscreen wiper onto the drive arm and an unlocking position, allowing the connector to slide longitudinally forward in relation to the drive arm, wherein the connector is made so that, when the connector is in installed position on the installation element, the hinge axis is closer to an end of the drive arm opposite to the free end of the drive arm than the opposite end of the tab.

6. The assembly according to claim 1, wherein the connector-side end of the tab is resting downwards against a top part of the installation element.

7. The assembly according to claim 1, wherein the connector comprises an attachment part that is equipped with a housing open towards a bottom.

8. The assembly according to claim 1, wherein the installation element is installed in a wiper comprising a stiffening spine.

9. The assembly according to claim 1, wherein said installation element has an opening configured to accommodate a spoiler of the wiper in an installed position of the connector in the wiper arm.

* * * * *